United States Patent
Sato et al.

(10) Patent No.: US 10,978,907 B1
(45) Date of Patent: Apr. 13, 2021

(54) MANAGEMENT SYSTEM, MANAGEMENT METHOD, APPARATUS AND CONTROL DEVICE

(71) Applicant: KYOCERA CORPORATION, Kyoto (JP)

(72) Inventors: Yuri Sato, Kawasaki (JP); Kazutaka Nakamura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 471 days.

(21) Appl. No.: 15/999,808

(22) PCT Filed: Feb. 16, 2017

(86) PCT No.: PCT/JP2017/005706
§ 371 (c)(1),
(2) Date: Aug. 20, 2018

(87) PCT Pub. No.: WO2017/142016
PCT Pub. Date: Aug. 24, 2017

(30) Foreign Application Priority Data

Feb. 19, 2016 (JP) .............................. JP2016-029945

(51) Int. Cl.
*H02J 13/00* (2006.01)
*H02J 3/38* (2006.01)
*H02J 3/32* (2006.01)

(52) U.S. Cl.
CPC .......... *H02J 13/00007* (2020.01); *H02J 3/32* (2013.01); *H02J 3/381* (2013.01)

(58) Field of Classification Search
CPC ........ H02J 13/00; H02J 13/00007; H02J 3/32; H02J 3/381; H02J 3/38
See application file for complete search history.

(56) References Cited

U.S. PATENT DOCUMENTS

2013/0211612 A1    8/2013   Ahn et al.

FOREIGN PATENT DOCUMENTS

| EP | 2903216 A1 | 8/2015 |
| JP | 2010-128810 A | 6/2010 |

*Primary Examiner* — Robert L Deberadinis
(74) *Attorney, Agent, or Firm* — Hauptman Ham, LLP

(57) ABSTRACT

A management system comprises a control device and a plurality of apparatuses. Each of the plurality of apparatuses comprises a transmitter configured to transmit an instance list of the apparatus by broadcasting or multicasting after a restart of the apparatus. The control device comprises: a management unit configured to manage the plurality of apparatuses as a plurality of management apparatuses before a stop state in which supply of power is stopped; and a transmitter configured to transmit a request command requesting transmission of the instance list to a non-reception apparatus for which the control device could not receive the instance list in a resumed state in which the supply of power is resumed.

12 Claims, 4 Drawing Sheets

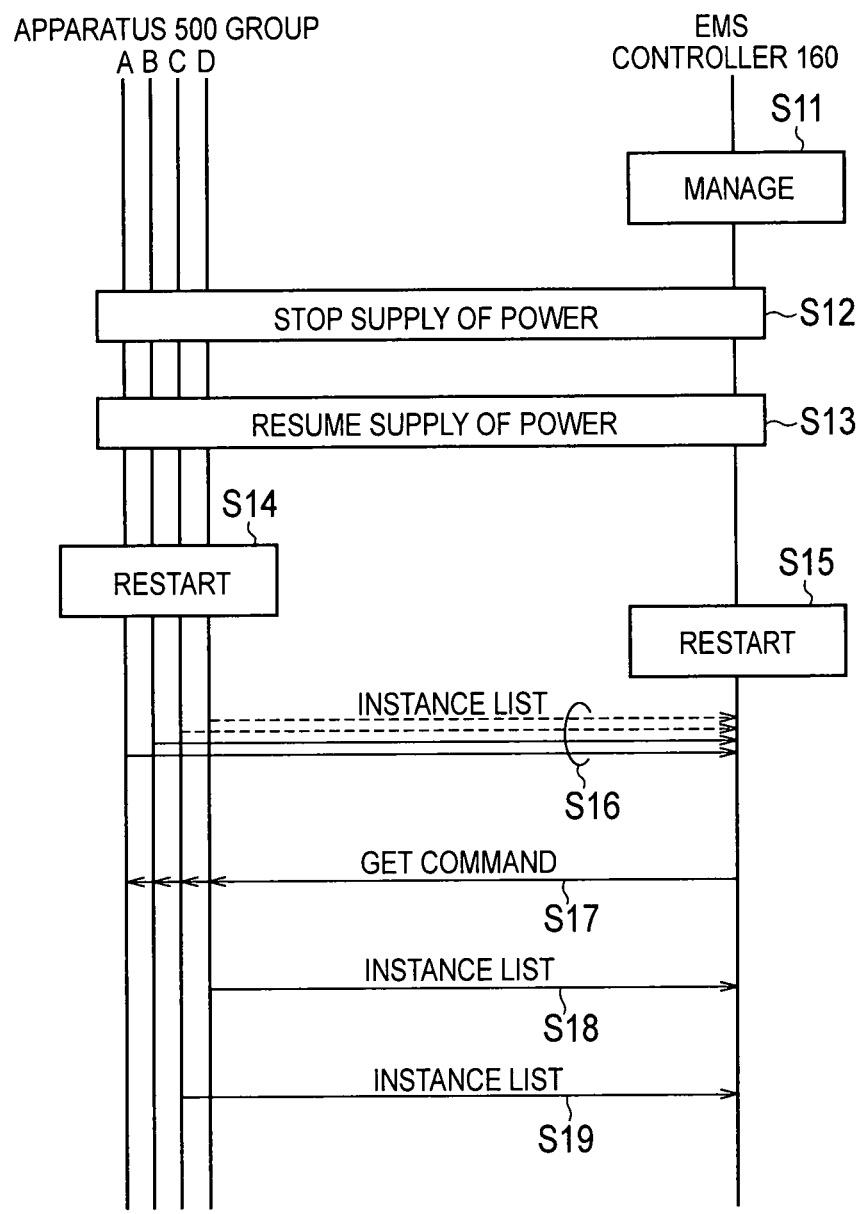

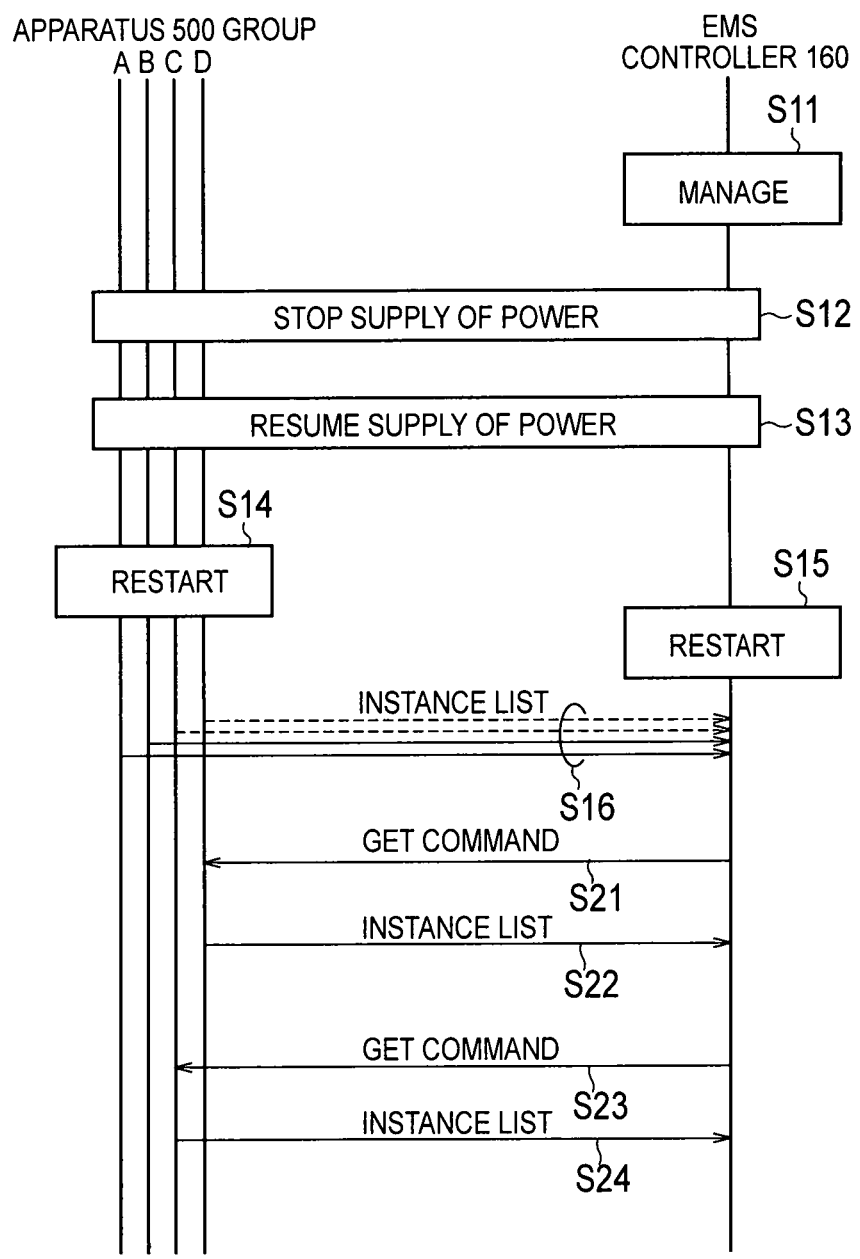

MANAGEMENT SYSTEM, MANAGEMENT METHOD, APPARATUS AND CONTROL DEVICE

RELATED APPLICATIONS

The present application is a National Phase of International Application Number PCT/JP2017/005706, filed On Feb. 16, 2017, and claims priority to Japanese Application Number 2016-029945, filed on Feb. 19, 2016.

TECHNICAL FIELD

The present invention relates to a management system, a management method, an apparatus, and a control device.

BACKGROUND ART

Recently, a management system including a plurality of apparatuses and a control device for controlling the plurality of apparatuses has been proposed (for example, Patent Literature 1). The plurality of apparatuses are, for example, household electrical apparatuses such as air conditioner or lighting devices, distributed power supplies such as solar cells, storage batteries, or fuel power generators, and the like. The control device is referred to as, for example, a home energy management system (HEMS), a store energy management system (SEMS), a building energy management system (BEMS), a factory energy management system (FEMS), or a cluster/community energy management system (CEMS).

In order to spread the above-described management system, it is effective to share the communication standards between the plurality of apparatuses and the control device, and attempts have been made to standardize such communication standards.

CITATION LIST

Patent Literature

Patent Literature 1: JP 2010-128810 A

SUMMARY

A management system comprises a control device and a plurality of apparatuses. Each of the plurality of apparatuses comprises a transmitter configured to transmit an instance list of the apparatus by broadcasting or multicasting after a restart of the apparatus. The control device comprises: a management unit configured to manage the plurality of apparatuses as a plurality of management apparatuses before a stop state in which supply of power is stopped; and a transmitter configured to transmit a request command requesting transmission of the instance list to a non-reception apparatus for which the control device could not receive the instance list in a resumed state in which the supply of power is resumed.

A management method comprises: transmitting an instance list of an apparatus by broadcasting or multicasting from each of a plurality of apparatuses to a control device after restarting the apparatus; managing, by the control device, the plurality of apparatuses as a plurality of management apparatuses before a stop state in which supply of power is stopped; and transmitting a request command requesting transmission of the instance list to a non-reception apparatus for which the control device could not receive the instance list, from the control device in a resumed state in which the supply of power is resumed.

An apparatus comprises a transmitter configured to transmit an instance list of the apparatus by broadcasting or multicasting after the apparatus is restarted; and a receiver configured to receive, from a control device, a request command requesting transmission of the instance list. The transmitter is configured to retransmit the instance list to the control device in response to reception of the request command even after transmitting the instance list by broadcasting or multicasting.

A control device comprises a receiver configured to receive, after each of a plurality of apparatuses is restarted, an instance list of the apparatus; a management unit configured to manage the plurality of apparatuses as a plurality of management apparatuses before a stop state in which supply of power is stopped; and a transmitter configured to transmit a request command requesting transmission of the instance list to a non-reception apparatus for which the control device could not receive the instance list in a resumed state in which the supply of power is resumed.

BRIEF DESCRIPTION OF DRAWINGS

FIG. 4 is a diagram illustrating a management method according to an embodiment.

FIG. 5 is a diagram illustrating a management method according to Modification 1.

DESCRIPTION OF EMBODIMENTS

Figure 1:
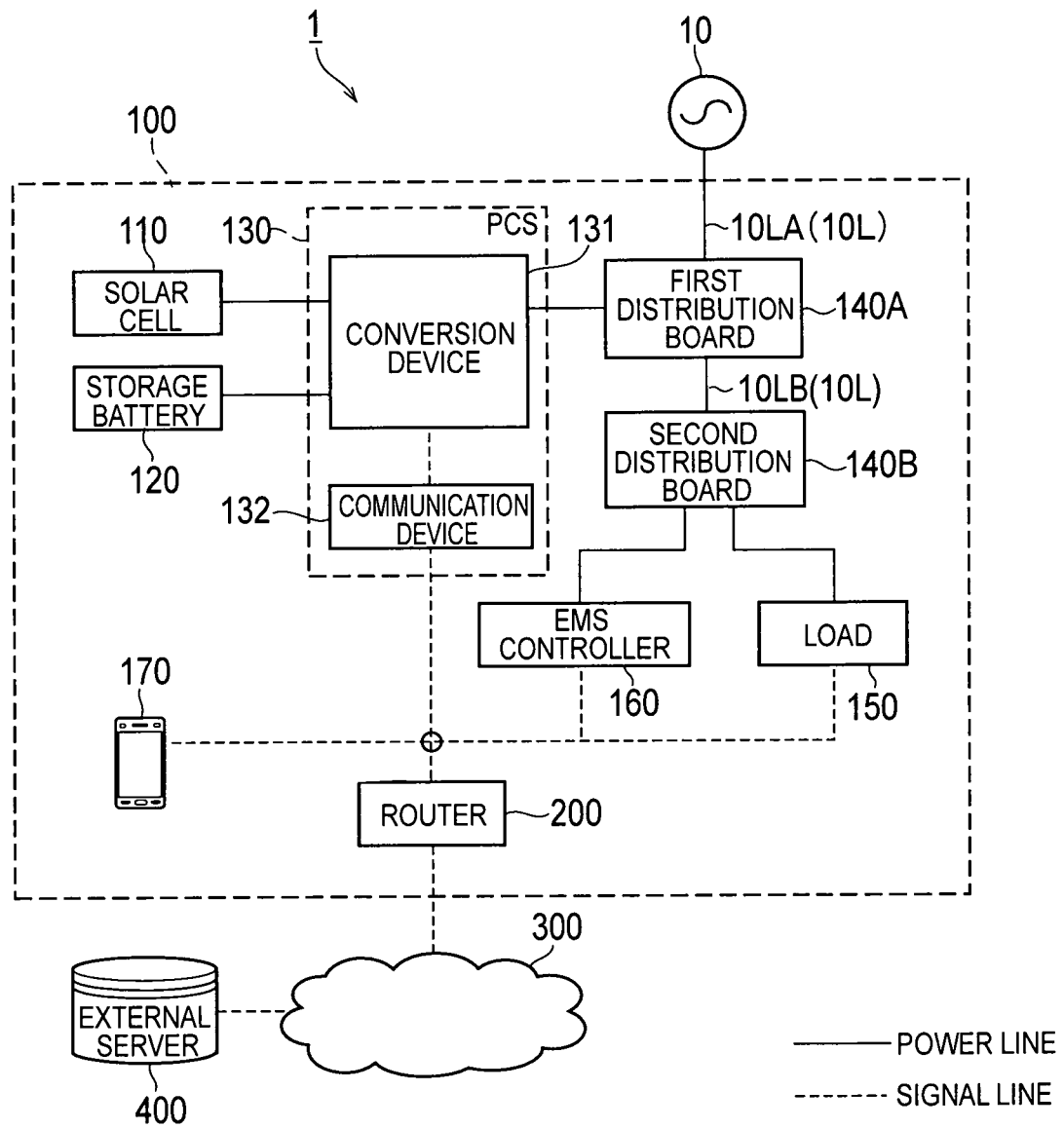
FIG. 1 is a diagram illustrating a power management system 1 according to an embodiment.

Hereinafter, an embodiment will be described with reference to the drawings. In the following description of the drawings, the same or similar reference numerals are assigned to the same or similar parts.

However, it should be noted that the drawings are schematic and ratios of dimensions and the like may be different from actual ones. Therefore, concrete dimensions and the like should be determined with reference to the following explanation. In addition, the drawings may include portions having different dimensional relationships or ratios.

Embodiment (Power Management System)

Hereinafter, a power management system according to an embodiment will be described.

As illustrated in FIG. 1, the power management system 1 includes a facility 100 and an external server 400. The facility 100 includes a router 200. The router 200 is connected to the external server 400 via a network 300. The router 200 constitutes a local area network and is connected to, for example, a PCS 130, a load 150, an EMS controller 160, an operation terminal 170, and the like. In FIG. 1, a solid line indicates a power line, and a dashed line indicates a signal line. It should be noted that the present invention is not limited thereto, and a signal may be transmitted through a power line.

The facility 100 includes a solar cell 110, a storage battery 120, the PCS 130, a distribution board 140, the load 150, the EMS controller 160, and the operation terminal 170.

The solar cell 110 is an apparatus that generates power in response to light reception. The solar cell 110 outputs the generated direct current power (hereinafter referred to as DC power). The power generation amount of the solar cell 110 varies according to the amount of solar radiation applied to the solar cell 110.

The storage battery 120 is an apparatus that accumulates power. The storage battery 120 outputs the accumulated DC power.

The PCS 130 is an example of a power conditioning system (PCS) that converts DC power into AC power. In the embodiment, the PCS 130 includes a conversion device 131 and a communication device 132.

The conversion device 131 converts DC power input from the solar cell 110 into alternating current power (hereinafter referred to as AC power) and converts DC power input from the storage battery 120 into AC power. The conversion device 131 converts AC power supplied from a power grid 10 into DC power. The communication device 132 is connected to the conversion device 131, receives various messages to the conversion device 131, and transmits various messages from the conversion device 131. In the communication between the communication device 132 and the conversion device 131, a protocol not conforming to a predetermined protocol to be described later (for example, a proprietary protocol) may be used.

In the embodiment, the conversion device 131 is connected to a main power line 10L (here, a main power line 10LA and a main power line 10LB) connected to the power grid 10 via a first distribution board 140A, and is connected to both the solar cell 110 and the storage battery 120. The main power line 10LA is a power line that connects the power grid 10 and the first distribution board 140A, and the main power line 10LB is a power line that connects the first distribution board 140A and the second distribution board 140B.

The distribution board 140 is connected to the main power line 10L. The distribution board 140 includes the first distribution board 140A and the second distribution board 140B. The first distribution board 140A is connected to the power grid 10 via the main power line 10LA and is also connected to the solar cell 110 and the storage battery 120 via the conversion device 131. In addition, the first distribution board 140A controls the power output from the conversion device 131 and the power supplied from the power grid 10 to flow through the main power line 10LB. The power flowing from the main power line 10LB is distributed to each apparatus (here, the load 150 and EMS controller 160) by the second distribution board 140B.

The load 150 is an apparatus that consumes the power supplied via the power line. For example, the load 150 includes apparatuses such as a refrigerator, a lighting, an air conditioner, a television, and the like. The load 150 may be a single apparatus or a plurality of apparatuses.

The EMS controller 160 is an energy management system (EMS) that controls each apparatus (for example, the solar cell 110, the storage battery 120, the PCS 130, or the load 150). Specifically, the EMS controller 160 is connected to each apparatus via the router 200 and performs communication of a predetermined message conforming to a predetermined protocol with each apparatus.

In the embodiment, the predetermined protocol is not particularly limited, and for example, may be ECHONET Lite, SEP 2.0, KNX, or the like. A predetermined format is, for example, a format conforming to ECHONET Lite. The predetermined message is, for example, a SET command, a GET command, a response command to the SET command, a response command to the GET command, or an INF command. The SET command is a message for instructing setting or operation on an apparatus. The GET command is a message for acquiring the state of the apparatus. The response command to the SET command is a message indicating that setting or operation instructed by the SET command has been received. The response command to the GET command is a message including the information requested by the GET command. The INF command is a message for notifying the state of the PCS 130.

The operation terminal 170 is a terminal that remotely operates each apparatus (for example, the solar cell 110, the storage battery 120, the PCS 130, or the load 150) by transmitting an access request to the EMS controller 160. A protocol (for example, a proprietary protocol) not conforming to a predetermined protocol may be used for communication between the operation terminal 170 and the EMS controller 160. The operation terminal 170 is, for example, a smartphone, a tablet, or a dedicated terminal. The operation terminal 170 is connected to the EMS controller 160 by wire or by wireless and communicates with the EMS controller 160. The operation terminal 170 may perform communication of a predetermined message having a predetermined format with the EMS controller 160.

The external server 400 is a server managed by a power company or a power aggregator. The external server 400 transmits a power command message to the PCS 130 or the EMS controller 160.

The power command message is a message relating to the suppression of the forward power flow amount that is the amount of power supplied from the power grid 10 or the reverse power flow amount that is the amount of power supplied to the power grid 10. The power command message relating to the reduction of the forward power flow amount may be, for example, a message to the effect that a requested amount of reduction of the power consumption amount is o % reduction, a message to the effect that a requested amount of reduction of the power consumption amount is o kwh reduction, or a message to the effect that incentives are presented according to the reduction amount. For the message relating to the suppression of the reverse power flow, for example, a message to the effect that the reverse power flow is reduced by o % is assumed. If the distributed power supply such as the storage battery 120 provided in the facility 100 is used for a virtual power plant (VPP), the power command message may be a message for controlling the distributed power supply.

(Control Device)

Figure 2:
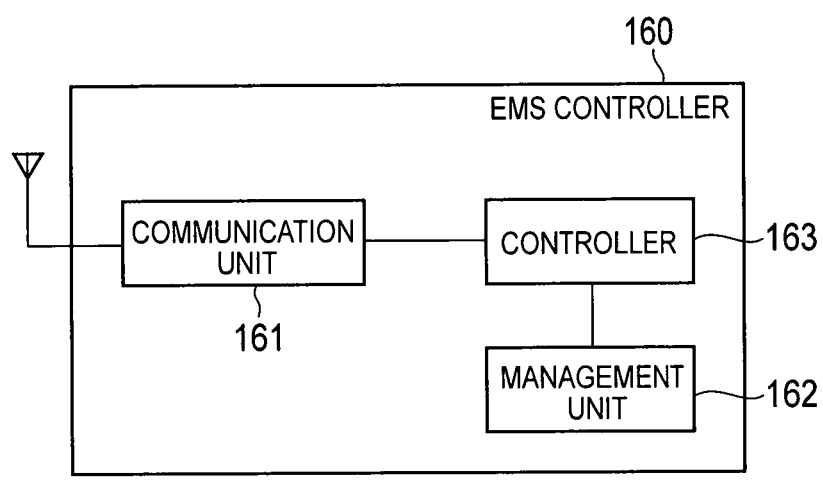
FIG. 2 is a diagram illustrating an EMS controller 160 according to an embodiment.

Hereinafter, a control device according to an embodiment will be described. As illustrated in FIG. 2, the control device (EMS controller 160) includes a communication unit 161, a management unit 162, and a controller 163.

The communication unit 161 includes a communication module and communicates with each apparatus (for example, the solar cell 110, the storage battery 120, the PCS 130, or the load 150). The communication unit 161 communicates with the operation terminal 170 and the external server 400.

After each of the plurality of apparatuses is restarted, the communication unit 161 receives an instance list that is a list of instances representing the entities of the apparatuses. The communication unit 161 may receive the instance list by broadcasting or multicasting. The communication unit 161 may receive the instance list by unicast. In such a case, the router 200 may transmit the instance list, which is transmitted from each apparatus by multicasting or broadcasting, to the EMS controller 160 by unicast. The communication unit 161 transmits, to a non-reception apparatus, a request command for requesting transmission of the instance list in the resumed state in which the supply of power is resumed. The non-reception apparatus is an apparatus for which the communication unit 161 could not receive the instance list among a plurality of management apparatuses managed by the management unit 162. Here, the management apparatus refers to an apparatus managed by the management unit 162 among a plurality of apparatuses.

Here, the "instance" is a term representing the entity of the apparatus constituting one node. For example, if a plurality of air conditioners are provided for one node, each air conditioner is a different instance. On the other hand, if an air conditioner and a sensor associated with the air conditioner are provided for one node, the air conditioner and the sensor may be the same instance.

The management unit 162 includes a volatile or nonvolatile memory, or a disk drive such as HDD or SSD, and manages various kinds of information. The management unit 162 manages a plurality of apparatuses as a plurality of management apparatuses before a stop state in which the supply of power is stopped. For example, the management unit 162 manages the unique information corresponding to each of the plurality of management apparatuses, the IP address corresponding to each of the plurality of management apparatuses, the installation location of each of the plurality of management apparatuses, and the like.

Here, the unique information is information for identifying the apparatus in the EMS controller 160 and is information unique to the apparatus that is not likely to be changed like the IP address. The unique information may be an identification number uniquely identifying the apparatus. Alternatively, the unique information may be an identification number for identifying a node profile class that specifies a class of a node having one or more apparatuses. Alternatively, the unique information may be a combination of an identification number for identifying a node profile class and information assigned for each apparatus object (number for specifying the instance). Alternatively, the unique information may be a combination of an address (MAC address or fixed IP address) assigned to the apparatus and information identifying the type of the object of the apparatus. In addition, the unique information may be a serial number of the apparatus.

The controller 163 includes a CPU and a memory and controls the EMS controller 160. In the resumed state in which the supply of power is resumed, if there is the above-mentioned non-reception apparatus, the controller 163 instructs the communication unit 161 to transmit the request command to the apparatus.

(Apparatus)

Figure 3:
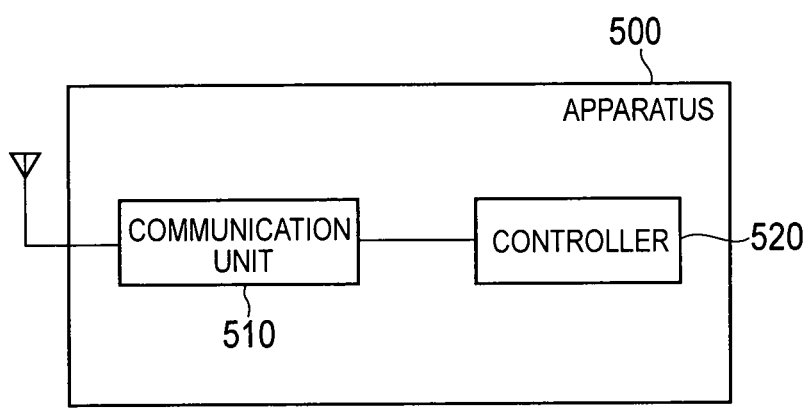
FIG. 3 is a diagram illustrating an apparatus 500 according to an embodiment.

Hereinafter, an apparatus according to an embodiment will be described. The apparatus 500 may be any apparatus that is controlled by the EMS controller 160, and is the solar cell 110, the storage battery 120, the PCS 130, or the load 150. As illustrated in FIG. 3, the apparatus 500 includes a communication unit 510, and a controller 520.

The communication unit 510 includes a communication module and communicates with the EMS controller 160.

After the apparatus 500 is restarted, the communication unit 510 transmits the instance list by broadcasting or multicasting. The communication unit 510 receives, from the EMS controller 160, a request command for requesting transmission of the instance list. Here, even after the instance list is broadcast or multicast, the communication unit 510 retransmits the instance list to the EMS controller 160 in response to reception of the request command.

The apparatus 500 is restarted when the supply of power to the apparatus 500 is resumed after the supply of power to the apparatus 500 is stopped. The case where the supply of power to the apparatus 500 is resumed may be a case where the supply of power is resumed by the power grid 10, and may be a case where the supply of power is resumed by a self-sustained operation.

The controller 520 includes a CPU and a memory and controls the apparatus 500. If the request command is received from the EMS controller 160 after the instance list is transmitted by broadcasting or multicasting, the controller 520 instructs the communication unit 510 to retransmit the instance list to the EMS controller 160.

(Management Method)

Hereinafter, a management method according to an embodiment will be described. In FIG. 4, apparatuses 500A to 500D are exemplified as the apparatus 500.

As illustrated in FIG. 4, in step S11, the EMS controller 160 manages the apparatuses 500A to 500D as the management apparatus.

In step S12, the supply of power to the EMS controller 160 and the apparatus 500 is stopped. As the case where the supply of power is stopped, for example, there are a case of power failure, a case where the supply of power is stopped manually or automatically, and the like.

In step S13, the supply of power to the EMS controller 160 and the apparatus 500 is resumed. The resumed state in which the supply of power is resumed is at least one of a state in which the supply of power is resumed by the power grid 10 and a state in which the supply of power is resumed by a self-sustained operation.

In step S14, the apparatus 500 is restarted, and in step S15, the EMS controller 160 is restarted. The restart timing of the EMS controller 160 may be the same as or different from the restart timing of the apparatus 500. In the example illustrated in FIG. 4, the restart of the EMS controller 160 is performed after the restart of the apparatus 500 is performed. However, after the restart of the EMS controller 160 is performed, the restart of the apparatus 500 may be performed.

In step S16, each of the plurality of apparatuses 500 transmits the instance list by broadcasting or multicasting. However, in the example illustrated in FIG. 4, it is assumed that the instance list transmitted from the apparatus 500C and the apparatus 500D is not received by the EMS controller 160.

In step S17, the EMS controller 160 transmits, to the non-reception apparatus (the apparatus 500C and the apparatus 500D), a request command (here, a GET command) requesting the transmission of the instance list. Here, since the apparatuses 500A to 500D are managed as the management apparatuses in step S11, it should be noted that the EMS controller 160 can determine the presence or absence of the non-reception apparatus. For example, the EMS controller 160 transmits the request command by broadcasting or multicasting.

In step S18, the apparatus 500C retransmits the instance list to the EMS controller 160 in response to reception of the request command. Similarly, in step S19, the apparatus 500D retransmits the instance list to the EMS controller 160 in response to reception of the request command.

When the request command is transmitted from the EMS controller 160 to the apparatus 500 by broadcasting or multicasting, the apparatus 500 cannot determine whether the instance list has reached the EMS controller 160. Therefore, basically, the apparatus 500A and the apparatus 500B also retransmit the instance list to the EMS controller 160. However, the request command may include information for identifying the already received apparatus from which the EMS controller 160 could receive the instance list. Therefore, the retransmission of the instance list from the apparatus 500A and the apparatus 500B to the EMS controller 160 can be omitted.

(Operation and Effect)

In the embodiment, the EMS controller 160 transmits, to the non-reception apparatus, the request command for requesting transmission of the instance list in the resumed state in which the supply of power is resumed. That is, even if the EMS controller 160 fails to receive the instance list transmitted by broadcasting or multicasting from the non-transmission apparatus, the EMS controller 160 attempts to acquire the instance list by the request command. If the instance list can be acquired by such an operation, the convenience of the system as a whole is improved since the non-reception apparatus can be used. Further, since the EMS controller 160 determines that the non-reception apparatus cannot be used only when the instance list cannot be acquired by such an operation, it is possible to improve the accuracy of determining whether the non-reception apparatus can be used.

[Modification 1]

Hereinafter, Modification 1 of the embodiment will be described. The difference from the embodiment will be mainly described below.

In the embodiment, the EMS controller 160 transmits the request command by broadcasting or multicasting. On the other hand, the EMS controller 160 individually transmits the request command to the non-reception apparatus by using the IP address managed by the EMS controller 160.

Specifically, description will be provided with reference to FIG. 5. In FIG. 5, the same steps as those in FIG. 4 are denoted by the same step numbers. Therefore, the description of steps S11 to S16 will be omitted.

As illustrated in FIG. 5, in step S21, the EMS controller 160 individually transmits the request command (here, the GET command) requesting the transmission of the instance list to the non-reception apparatus (apparatus 500C) by using the IP address of the apparatus 500C managed in step S11. In step S22, the apparatus 500C retransmits the instance list to the EMS controller 160 in response to reception of the request command.

Similarly, in step S23, the EMS controller 160 individually transmits the request command requesting the transmission of the instance list to the non-reception apparatus (apparatus 500D) by using the IP address of the apparatus 500D managed in step S11. In step S24, the apparatus 500D retransmits the instance list to the EMS controller 160 in response to reception of the request command.

In such a case, the EMS controller 160 may transmit the request command to two or more non-reception apparatuses (the apparatus 500C and the apparatus 500C) at different timing. That is, the timing of step S21 and step S22 may be different.

Alternatively, the request command may include information (retransmission timing information) designating the retransmission timing at which each of two or more non-reception apparatuses (the apparatus 500C and the apparatus 500C) retransmits the instance list. The retransmission timing may be different for each of two or more non-reception apparatuses. The retransmission timing information may be, for example, a time of transmitting the instance list, may be a waiting time from reception to transmission, or may be a waiting time from the transmission time of the request command of the EMS controller 160.

The retransmission timing information may be set for, for example, each apparatus 500. More specifically, in the retransmission timing information, the retransmission timing may be set based on a list for each preset apparatus (for example, the storage battery 1, the storage battery 2, the fuel cell 1, the fuel cell 2, the solar battery 1, the solar battery 2, or the like), or may be set based on each apparatus managed before the supply of power is stopped.

In addition, the retransmission timing information may be set for each model of the apparatus 500. The model of the apparatus 500 is, for example, a category unit such as the storage battery, the solar battery, the fuel cell, or the like. If a plurality of storage batteries are provided as the apparatus 500, the plurality of storage batteries may be set such that retransmission timing are the same.

If there are three or more apparatuses 500, at least one retransmission timing has only to be different from the others, among which the retransmission timing may be the same. Therefore, it is possible to reduce congestion when the instance list is transmitted from the apparatus 500.

Other Embodiments

Although the present invention has been described with reference to the above-described embodiments, it should not be understood that the description and drawings constituting a part of this disclosure limit the present invention. From this disclosure, various alternative embodiments, examples, and operational technologies will become apparent to those skilled in the art.

If the instance list cannot be received even after a predetermined time has elapsed since the request command is individually transmitted to the non-reception apparatus by using the IP address, the EMS controller 160 (the communication unit 161) may transmit the request command by broadcasting. Such an operation is effective in a case where the IP address assigned to the non-reception apparatus is changed under an environment where the IP addresses are dynamically assigned.

The EMS controller 160 is a device connected to the network 300, and the function of the EMS controller 160 may be provided by a cloud service via the network 300.

The entire contents of Japanese Patent Application No. 2016-29945 (filed on Feb. 19, 2016) are incorporated herein by reference.

The invention claimed is:

1. A management system comprising a control device and a plurality of apparatuses, wherein
   each of the plurality of apparatuses comprises a transmitter configured to transmit an instance list of the apparatus by broadcasting or multicasting after a restart of the apparatus, and
   the control device comprises:
   a management unit configured to manage the plurality of apparatuses as a plurality of management apparatuses before a stop state in which supply of power is stopped; and
   a transmitter configured to transmit a request command requesting transmission of the instance list to a first apparatus for which the control device fails to receive the instance list in a resumed state in which the supply of power is resumed.

2. The management system according to claim 1, wherein the transmitter of the control device is configured to transmit the request command by broadcasting or multicasting.

3. The management system according to claim 1, wherein the management unit is configured to manage a plurality of IP addresses corresponding to each of the plurality of management apparatuses, and
the transmitter of the control device is configured to individually transmit the request command to the first apparatus by using the IP address.

4. The management system according to claim 3, wherein the transmitter of the control device is configured to transmit the request command by broadcasting, when the instance list cannot be received even when a predetermined time elapses from the individual transmission of the request command to the first apparatus by using the IP address.

5. The management system according to claim 3, wherein the transmitter of the control device is configured to
when there are two or more first apparatuses as the non-receptionfirst apparatus, transmit the request command to each of the two or more non-receptionfirst apparatuses at different timing.

6. The management system according to claim 1, wherein the resumed state in which the supply of power is resumed is at least one of a state in which the supply of power is resumed by a power grid and a state in which the supply of power is resumed by a self-sustained operation.

7. The management system according to claim 1, wherein when there are two or more first apparatuses as the first apparatus, the request command includes information designating a retransmission timing at which each of the two or more first apparatuses retransmits the instance list.

8. The management system according to claim 7, wherein the retransmission timing is different for each of the two or more first apparatuses.

9. The management system according to claim 1, wherein the request command includes information identifying a second apparatus from which the control device could receive the instance list.

10. A management method comprising:
transmitting an instance list of an apparatus by broadcasting or multicasting from each of a plurality of apparatuses to a control device after restarting the apparatus;
managing, by the control device, the plurality of apparatuses as a plurality of management apparatuses before a stop state in which supply of power is stopped; and
transmitting a request command requesting transmission of the instance list to a first apparatus for which the control device fails to receive the instance list, from the control device in a resumed state in which the supply of power is resumed.

11. An apparatus comprising:
a transmitter configured to transmit an instance list of the apparatus by broadcasting or multicasting after the apparatus is restarted; and
a receiver configured to receive, from a control device, a request command requesting transmission of the instance list, wherein
the transmitter is configured to retransmit the instance list to the control device in response to reception of the request command even after transmitting the instance list by broadcasting or multicasting.

12. A control device comprising:
a receiver configured to receive, after each of a plurality of apparatuses is restarted, an instance list of the apparatus;
a management unit configured to manage the plurality of apparatuses as a plurality of management apparatuses before a stop state in which supply of power is stopped; and
a transmitter configured to transmit a request command requesting transmission of the instance list to a first apparatus for which the control device fails to receive the instance list in a resumed state in which the supply of power is resumed.

* * * * *